US005149156A

United States Patent [19]

Kleefeldt

[11] Patent Number: 5,149,156

[45] Date of Patent: Sep. 22, 1992

[54] POWER DOOR-LOCK ACTUATOR WITH PIVOTING ROCKER AND CONNECTING GEARS

[75] Inventor: Frank Kleefeldt, Heilingenhaus, Fed. Rep. of Germany

[73] Assignee: Kiekert GmbH & Co., Heiligenhaus, Fed. Rep. of Germany

[21] Appl. No.: 813,263

[22] Filed: Dec. 24, 1991

[30] Foreign Application Priority Data

Mar. 16, 1991 [DE] Fed. Rep. of Germany ....... 4108641

[51] Int. Cl.$^5$ .......................... E05C 3/06; F16H 57/00

[52] U.S. Cl. .................................. 292/336.3; 70/264; 292/201; 74/404; 74/421 A

[58] Field of Search ...................... 292/336.3, 144, 201, 292/DIG. 23; 70/264; 74/404, 421 A

[56] References Cited

U.S. PATENT DOCUMENTS

| | | | |
|---|---|---|---|
| 3,103,122 | 9/1963 | Reichelt | 74/404 |
| 3,397,589 | 8/1968 | Moore | 74/404 |
| 4,137,789 | 2/1978 | Herleth | 74/404 |
| 4,735,447 | 4/1988 | Kleefeldt et al. | 292/201 |
| 4,862,766 | 9/1989 | Mölders | 74/404 |
| 4,974,886 | 12/1990 | Kleefeldt et al. | 70/264 |
| 4,978,154 | 12/1990 | Kleefeldt et al. | 292/201 |
| 5,056,343 | 10/1991 | Kleefeldt et al. | 70/264 |
| 5,078,436 | 1/1992 | Kleefeldt et al. | 70/264 |

*Primary Examiner*—Eric K. Nicholson

*Attorney, Agent, or Firm*—Herbert Dubno; Andrew M. Wilford

[57] ABSTRACT

A power door-lock actuator has a housing adjacent the lock, a reversible electric motor in the housing having an output shaft extending along a motor axis, and an input gear fixed on the output shaft and rotatable thereby about the motor axis. A threaded spindle extending in the housing along a spindle axis adjacent the motor axis carries an output gear and a nut threaded on the spindle is movable along the spindle axis on rotation of the spindle between a pair of axially offset positions. A link connected between the nut and the lock can move the lock between its locked and unlocked positions on displacement of the nut between its end positions. A manual actuator, for instance an inside door-lock button, is coupled to the nut for manually displacing the nut between its end positions. A rocker pivotal about the shaft axia at the input gear carries a pair of connecting gears flanking and meshing with the input gear. This rocker is pivotal between angled positions in each of which a respective one of the connecting gears meshes with the output gear and through a central position with neither of the connecting gears meshing with the output gear. A spring urges the rocker into the central position so that torque transmitted to the rocker on rotation of the input gear pivots the rocker depending on input-gear rotation direction into one of its angled positions to couple the input gear to the output gear.

5 Claims, 2 Drawing Sheets

POWER DOOR-LOCK ACTUATOR WITH PIVOTING ROCKER AND CONNECTING GEARS

FIELD OF THE INVENTION

The present invention relates to an actuator for a power door lock. More particularly this invention concerns such an actuator used in a motor-vehicle door lock and having a manual override.

BACKGROUND OF THE INVENTION

As described in commonly owned U.S. Pat. No. 5,056,343 issued Oct. 15, 1991 a motor-vehicle latch has an actuating lever displaceable between a position in which a respective door of the vehicle is locked and a position in which the respective door is unlocked. A locking knob connected to the lever is accessible from inside the vehicle to displace the lever between its positions. The actuator has a housing mounted directly on the door latch and formed with at least one longitudinally directed abutment face, a motor in the housing, a nut longitudinally displaceable in the housing by the motor between unlocked, locked, and antitheft positions, and a slide in the housing movable by the nut between locked and unlocked positions and formed with a recess receiving a portion projecting from the lever. At least one flexible arm extends longitudinally from the slide and has a head formed with a face directed longitudinally opposite the abutment face of the housing. These faces longitudinally confront but are out of longitudinal line with each other in the locked positions of the slide and nut. An actuating formation on the nut is engageable with the arm for laterally elastically deflecting the arm on displacement of the nut from the respective locked to the antitheft position. Thus the faces are longitudinally aligned and prevent displacement of the slide into the unlocked position with the nut in th antitheft position.

Such a lock has a manual override so that in the locked and unlocked positions the slide can be shifted manually. While this system is fairly effective, manually overriding the power actuation upsets the timing of the assembly. Thus once, for instance, a door that has been locked by the power actuator has been unlocked manually, it is necessary to cycle the power actuator through the locked position to set the parts back in the right positions relative to each other.

OBJECTS OF THE INVENTION

It is therefore object of the present invention to provide an improved vehicle power-lock actuator.

Another object is the provision of such an improved vehicle power-lock actuator which overcomes the above-given disadvantages, that is which does not need to be reset after manual actuation.

SUMMARY OF THE INVENTION

The instant invention is used in combination with a door lock movable between an locked position and an unlocked position. It is an actuator having a housing adjacent the lock, a reversible electric motor in the housing having an output shaft extending along a motor axis, and an input gear fixed on the output shaft and rotatable thereby about the motor axis. A threaded spindle extending in the housing along a spindle axis adjacent the motor axis carries an output gear and a nut threaded on the spindle is movable along the spindle axis on rotation of the spindle between a pair of axially offset positions. A link connected between the nut and the lock can move the lock between its locked and unlocked positions on displacement of the nut between its end positions. A manual actuator, for instance an inside door-lock button, is coupled to the nut for manually displacing the nut between its end positions. A rocker pivotal about the shaft axis at the input gear carries a pair of connecting gears centered on axes parallel to the shaft axis and both flanking and meshing with the input gear. This rocker is pivotal between one angled position with one of the connecting gears meshing with the output gear and another angled position with the other of the connecting gears meshing with the output gear and through a central position with neither of the connecting gears meshing with the output gear. A spring urges the rocker into the central position so that torque transmitted to the rocker on rotation of the input gear pivots the rocker depending on input-gear rotation direction into one of its angled positions to couple the input gear to the output gear.

Thus with this system operation of the motor automatically couples one of the connecting gears to the output gear, but when the motor is not energized and rotating the input gear neither of these connecting gears is in mesh with the output gear, and the input gear never meshes with the output gear. Thus the manual-actuation element can shift the nut but the motor can take over displacing it in any position, without having to resynchronize the positions of the parts.

According to another feature of the invention the rocker is of U-section and has a pair of longitudinally extending sides through which the output shaft extends and flanking the input and connecting gears. Furthermore the motor axis and spindle axis are parallel and define a plane and the spring is a compression spring braced between the rocker and the housing and generally centered on the plane.

The link of this invention is a lever pivoted on the housing and having one end connected to the nut.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
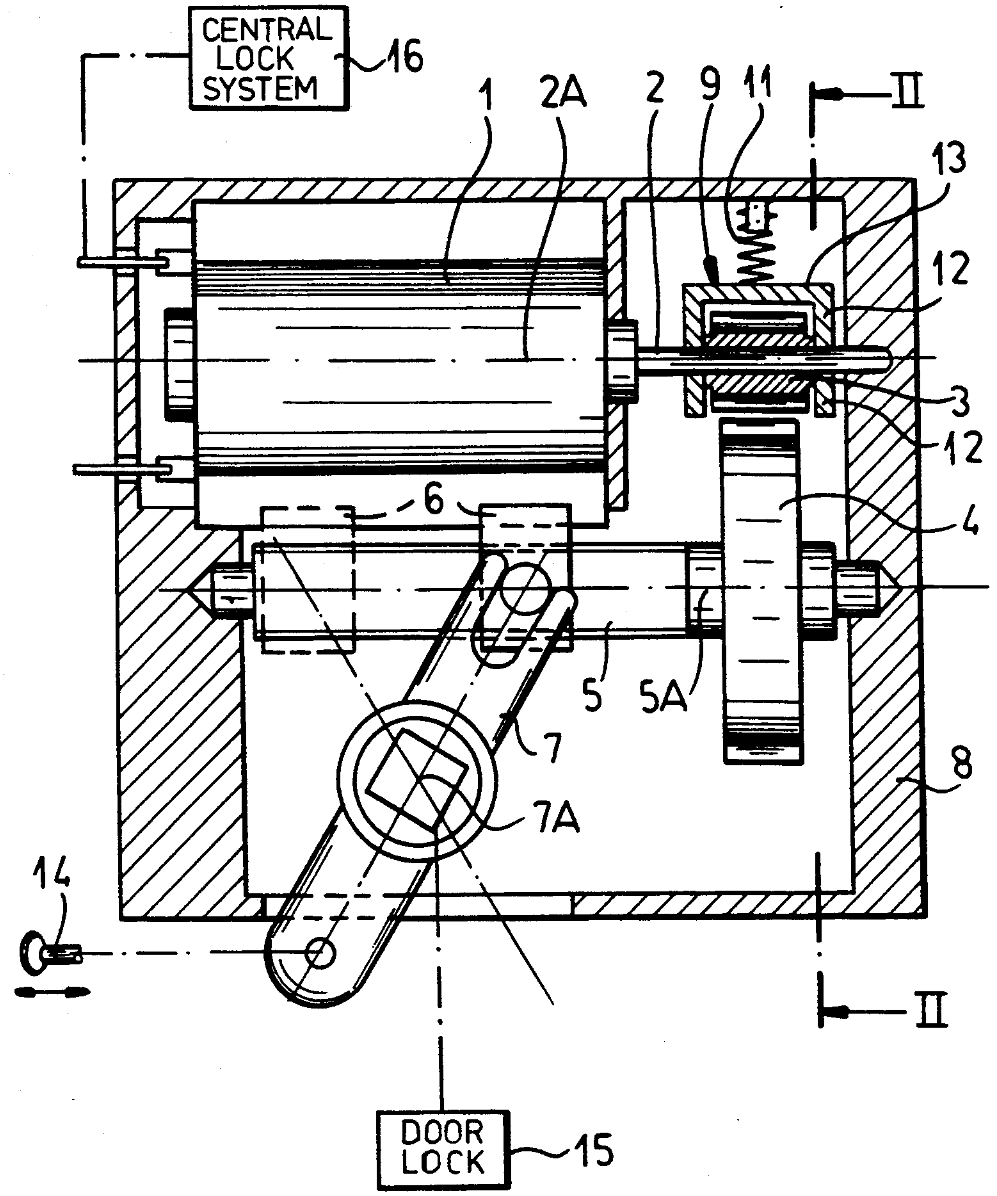
FIG. 1 is a partly diagrammatic vertical section through the actuator of this invention.

As seen in the drawing a power actuator has a housing 8 in which is mounted a motor 1 having an output shaft 2 extending along a shaft axis 2A. The motor 1 is a reversible electric motor operated by a standard central lock system 16 and serving to shift a door lock shown schematically at 15 between a locked and unlocked position and, if desired, into an unillustrated antitheft position.

The shaft 2 carries a small-diameter input gear or pinion 3. An output gear 4 that is spaced from and out of mesh with this gear 3 is carried on a threaded spindle 5 rotatable in the housing 8 about an axis 5A parallel to the axis 2A and carrying a nut 6 constrained against rotating and coupled to the upper end of an operating link or lever 7. The door lock 15 is coupled to an unillustrated shaft fitted to the center of the lever 7 at its pivot axis 7A and a manual-actuation button or element 14 is coupled to the lower end of this lever 7. Movement of the nut 6 between its end positions, one of which is shown in FIG. 1 in solid lines and the other in dot-dash lines, pivots the lever 7 and moves the lock 15 between its locked and unlocked positions. Similarly manual actuation of the lever 7 by the element 14 can lock and unlock the door controlled by the lock 15.

According to the invention a rocker 9 is pivotal about the axis 2A. It has two longitudinally extending sides or flanks 12 that are traversed by the shaft 2 and a rear wall or web 13 connecting the sides 12. Journaled in these sides 12 to both sides of the input gear 3 are identical connecting pinions or gears 10 in permanent mesh with the gear 3. A compression spring 11 centered on a plane P defined by the axes 2A and 5A is compressed between the housing 8 and the rear wall 13 so as to normally urge the rocker 9 into the central solid-line position of FIG. 2.

Figure 2:
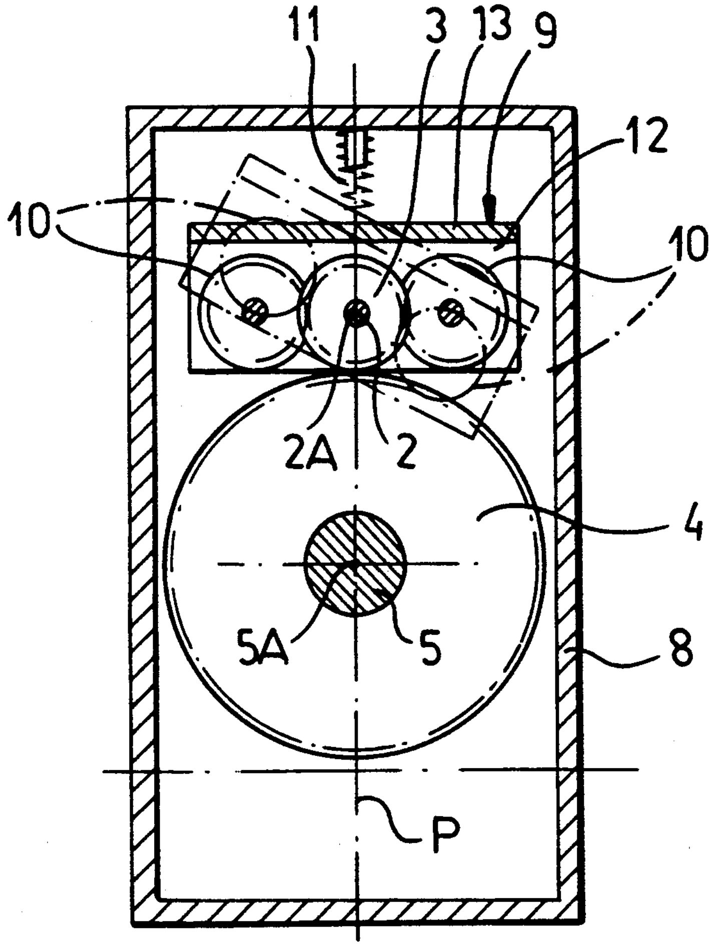
FIG. 2 is a section taken along line II—II of FIG. 1.

This rocker 9 can therefore move from the solid-line illustrated central position into two angled positions, one of which is shown in FIG. 2 in dot-dash lines. When in either of these angled positions the respective gear 10 meshes with the gear 4 and forms a torque-transmitting coupling between the gears 3 and 4. When in the solid-line central position there is no significant connection between the gears 3 and 4; that is the gear 4 can rotate freely relative to the gear 3.

Thus for power actuation of the nut 5 the motor shaft 2 rotates, for instance, in the clockwise direction. Due to the unavoidable friction between the parts on the rocker 9, this will have the effect of pushing down the right-hand side of the rocker 9 and lifting its left-hand side as seen in FIG. 2, thereby bringing the right-hand connecting gear 10, which will be rotating counterclockwise, into mesh with the gear 4. The result will therefore be clockwise rotation of the gear 4 and spindle 5. As soon as the motor 1 stops, the spring 11 will return the rocker 9 to the central solid-line position and decouple the right-hand gear 10 from the wheel 4. Opposite rotation of the gear 3 will oppositely tip the rocker 9 and bring the left-hand gear 10 into mesh with the gear 4, thereby oppositely rotating same.

When the motor 1 is not operating and, therefore, the rocker 9 is in the central position with the gears 10 and 4 decoupled, manual actuation of the lock 15 is possible simply by pivoting the lever 7 to force over the nut 6 and rotate the shaft 5. No matter what the position of the nut 6 on the shaft 5, power actuation, which is controlled by end-limit switches on the various lock parts, can take over at any time without having to resynchronize the positions of the device.

I claim:

1. In combination with a door lock movable between a locked position and an unlocked position, an actuator comprising:

a housing adjacent the lock;

a reversible electric motor in the housing having an output shaft extending along a motor axis;

an input gear fixed on the output shaft and rotatable thereby about the motor axis;

a threaded spindle extending in the housing along a spindle axis adjacent the motor axis;

an output gear fixed on the spindle;

a nut threaded on the spindle and movable along the spindle axis on rotation of the spindle between a pair of axially offset positions;

means including a link connected between the nut and the lock for moving the lock between its locked and unlocked positions on displacement of the nut between its end positions;

manual actuation means coupled to the nut for manually displacing the nut between its end positions;

a rocker pivotal about the shaft axis at the input gear;

a pair of connecting gears journaled in the rocker and flanking and meshing with the input gear, the rocker being pivotal between one angled position with one of the connecting gears meshing with the output gear and another angled position with the other of the connecting gears meshing with the output gear and through a central position with neither of the connecting gears meshing with the output gear; and spring means urging the rocker into the central position, whereby torque transmitted to the rocker on rotation of the input gear pivots the rocker depending on input-gear rotation direction into one of its angled positions to couple the input gear to the output gear.

2. The door-lock actuator defined in claim 1 wherein the rocker is of U-section and has a pair of longitudinally extending sides through which the output shaft extends and flanking the input and connecting gears.

3. The door-lock actuator defined in claim 2 wherein the motor axis and spindle axis are parallel and define a plane, the spring being a compression spring braced between the rocker and the housing and generally centered on the plane.

4. The door-lock actuator defined in claim wherein the input gear is spaced radially from and is out of mesh with the output gear.

5. The door-lock actuator defined in claim 1 wherein the link is a lever pivoted on the housing and having one end connected to the nut.

* * * * *